(12) United States Patent
Cormack et al.

(10) Patent No.: US 10,671,675 B2
(45) Date of Patent: Jun. 2, 2020

(54) SYSTEMS AND METHODS FOR A SCALABLE CONTINUOUS ACTIVE LEARNING APPROACH TO INFORMATION CLASSIFICATION

(71) Applicants: Gordon V. Cormack, Waterloo (CA); Maura R. Grossman, New York, NY (US)

(72) Inventors: Gordon V. Cormack, Waterloo (CA); Maura R. Grossman, New York, NY (US)

(*) Notice: Subject to any disclaimer, the term of this patent is extended or adjusted under 35 U.S.C. 154(b) by 1021 days.

(21) Appl. No.: 15/186,387

(22) Filed: Jun. 17, 2016

(65) Prior Publication Data

US 2016/0371262 A1 Dec. 22, 2016

Related U.S. Application Data

(60) Provisional application No. 62/182,028, filed on Jun. 19, 2015, provisional application No. 62/182,072, filed on Jun. 19, 2015.

(51) Int. Cl.
*G06F 16/93* (2019.01)
*G06N 20/00* (2019.01)
(Continued)

(52) U.S. Cl.
CPC .............. *G06F 16/93* (2019.01); *G06F 16/23* (2019.01); *G06F 16/35* (2019.01); *G06N 20/00* (2019.01)

(58) Field of Classification Search
CPC .......... G06F 16/23; G06F 16/35; G06F 16/93; G06N 20/00
See application file for complete search history.

(56) References Cited

U.S. PATENT DOCUMENTS 4,839,853 A 6/1989 Deerwester et al.
5,675,710 A 10/1997 Lewis
(Continued)

FOREIGN PATENT DOCUMENTS

CN 103092931 5/2013
WO WO 2013/010262 1/2013

OTHER PUBLICATIONS

Forman, "An extensive Empirical Study of Feature Selection Metrics for Text Classification," Journal of Maching Learning Research 3 (2003) 1289-1305.
(Continued)

*Primary Examiner* — Robert W Beausoliel, Jr
*Assistant Examiner* — Susan F Rayyan
(74) *Attorney, Agent, or Firm* — Bryan Cave Leighton Paisner LLP

(57) ABSTRACT

Systems and methods for classifying electronic information are provided by way of a Technology-Assisted Review ("TAR") process. In certain embodiments, the TAR process is a Scalable Continuous Active Learning ("S-CAL") approach. In certain embodiments, S-CAL selects an initial sample from a document collection, trains a classifier by using a default classification for a portion of the initial sample, scores the initial sample, selects a sub-sample from the initial sample for review, removes the reviewed sub-sample from the initial sample, and repeats the process by re-training the classifier until the initial sample is exhausted. In certain embodiments, a classification threshold is determined using a calculated estimate of the prevalence of relevant information such that the threshold classifies the information in accordance with a determined target criteria. In certain embodiments, the estimate of prevalence is determined from the results of iterations of a TAR process such as S-CAL.

26 Claims, 5 Drawing Sheets

(51) Int. Cl.
*G06F 16/23* (2019.01)
*G06F 16/35* (2019.01)

(56) References Cited

U.S. PATENT DOCUMENTS

| | | | |
|---|---|---|---|
| 5,675,819 A | 10/1997 | Schuetze | |
| 6,189,002 B1 | 2/2001 | Roitblat | |
| 6,463,430 B1 | 10/2002 | Brady et al. | |
| 6,678,679 B1 | 1/2004 | Bradford | |
| 6,687,696 B2 | 2/2004 | Hofman et al. | |
| 6,738,760 B1 | 5/2004 | Krachman | |
| 6,751,614 B1 | 6/2004 | Rao | |
| 6,778,995 B1 | 8/2004 | Gallivan | |
| 6,847,966 B1 | 1/2005 | Sommer et al. | |
| 6,888,548 B1 | 5/2005 | Gallivan | |
| 6,954,750 B2 | 10/2005 | Bradford | |
| 6,978,274 B1 | 12/2005 | Gallivan et al. | |
| 7,113,943 B2 | 9/2006 | Bradford et al. | |
| 7,197,497 B2 | 3/2007 | Cossock | |
| 7,272,594 B1 | 9/2007 | Lynch et al. | |
| 7,313,556 B2 | 12/2007 | Gallivan et al. | |
| 7,328,216 B2 | 2/2008 | Hofman et al. | |
| 7,376,635 B1 | 5/2008 | Porcari et al. | |
| 7,440,622 B2 | 10/2008 | Evans | |
| 7,461,063 B1 | 12/2008 | Rios | |
| 7,483,892 B1 | 1/2009 | Sommer et al. | |
| 7,502,767 B1 | 3/2009 | Forman | |
| 7,529,737 B2 | 5/2009 | Aphinyanaphongs et al. | |
| 7,529,765 B2 | 5/2009 | Brants et al. | |
| 7,558,778 B2 | 7/2009 | Carus et al. | |
| 7,574,409 B2 | 8/2009 | Patinkin | |
| 7,574,446 B2 | 8/2009 | Collier et al. | |
| 7,580,910 B2 | 8/2009 | Price | |
| 7,610,313 B2 | 10/2009 | Kawai et al. | |
| 7,657,522 B1 | 2/2010 | Puzicha et al. | |
| 7,676,463 B2 | 3/2010 | Thompson et al. | |
| 7,747,631 B1 | 6/2010 | Puzicha et al. | |
| 7,809,727 B2 | 10/2010 | Gallivan et al. | |
| 7,844,566 B2 | 11/2010 | Wnek | |
| 7,853,472 B2 | 12/2010 | Al-Abdulqader et al. | |
| 7,899,871 B1 | 3/2011 | Kumar et al. | |
| 7,912,698 B2 | 3/2011 | Statnikov et al. | |
| 7,933,859 B1 | 4/2011 | Puzicha et al. | |
| 8,005,858 B1 | 8/2011 | Lynch et al. | |
| 8,010,534 B2 | 8/2011 | Roitblat et al. | |
| 8,015,124 B2 | 9/2011 | Milo et al. | |
| 8,015,188 B2 | 9/2011 | Gallivan et al. | |
| 8,024,333 B1 | 9/2011 | Puzicha et al. | |
| 8,079,752 B2 | 12/2011 | Rausch et al. | |
| 8,103,678 B1 | 1/2012 | Puzicha et al. | |
| 8,126,826 B2 | 2/2012 | Pollara et al. | |
| 8,165,974 B2 | 4/2012 | Privault et al. | |
| 8,171,393 B2 | 5/2012 | Rangan et al. | |
| 8,185,523 B2 | 5/2012 | Lu et al. | |
| 8,189,930 B2 | 5/2012 | Renders et al. | |
| 8,219,383 B2 | 7/2012 | Statnikov et al. | |
| 8,275,772 B2 | 9/2012 | Aphinyanaphongs et al. | |
| 8,296,309 B2 | 10/2012 | Brassil et al. | |
| 8,326,829 B2 | 12/2012 | Gupta | |
| 8,346,685 B1 | 1/2013 | Ravid | |
| 8,392,443 B1 | 3/2013 | Allon et al. | |
| 8,429,199 B2 | 4/2013 | Wang et al. | |
| 8,527,523 B1 * | 9/2013 | Ravid | G06F 16/353 707/749 |
| 8,533,194 B1 | 9/2013 | Ravid et al. | |
| 8,543,520 B2 | 9/2013 | Diao | |
| 8,612,446 B2 * | 12/2013 | Knight | G06N 5/02 707/737 |
| 8,620,842 B1 * | 12/2013 | Cormack | G06N 20/00 706/12 |
| 8,706,742 B1 | 4/2014 | Ravid et al. | |
| 8,713,023 B1 | 4/2014 | Cormack et al. | |
| 8,751,424 B1 | 6/2014 | Wojcik | |
| 8,838,606 B1 | 9/2014 | Cormack et al. | |
| 8,996,350 B1 | 3/2015 | Dub et al. | |
| 9,122,681 B2 | 9/2015 | Cormack et al. | |
| 9,171,072 B2 | 10/2015 | Scholtes et al. | |
| 9,223,858 B1 | 12/2015 | Gummaregula et al. | |
| 9,235,812 B2 | 1/2016 | Scholtes | |
| 9,269,053 B2 | 2/2016 | Naslund et al. | |
| 9,595,005 B1 | 3/2017 | Puzicha et al. | |
| 9,607,272 B1 * | 3/2017 | Yu | G06N 20/00 |
| 9,886,500 B2 | 2/2018 | George et al. | |
| 2002/0007283 A1 | 1/2002 | Anelli | |
| 2003/0120653 A1 | 6/2003 | Brady et al. | |
| 2003/0139901 A1 | 7/2003 | Forman | |
| 2003/0140309 A1 | 7/2003 | Saito et al. | |
| 2004/0064335 A1 | 4/2004 | Yang | |
| 2005/0010555 A1 | 1/2005 | Gallivan | |
| 2005/0027664 A1 | 2/2005 | Johnson et al. | |
| 2005/0134935 A1 | 6/2005 | Schmidtler et al. | |
| 2005/0171948 A1 | 8/2005 | Knight | |
| 2005/0228783 A1 | 10/2005 | Shanahan | |
| 2005/0289199 A1 | 12/2005 | Aphinyanaphongs et al. | |
| 2006/0074908 A1 | 4/2006 | Selvaraj | |
| 2006/0161423 A1 | 7/2006 | Scott et al. | |
| 2006/0212142 A1 | 9/2006 | Madani et al. | |
| 2006/0242098 A1 | 10/2006 | Wnek | |
| 2006/0242190 A1 | 10/2006 | Wnek | |
| 2006/0294101 A1 | 12/2006 | Wnek | |
| 2007/0122347 A1 | 5/2007 | Statnikov et al. | |
| 2007/0156615 A1 | 7/2007 | Davar et al. | |
| 2007/0156665 A1 | 7/2007 | Wnek | |
| 2007/0179940 A1 | 8/2007 | Robinson et al. | |
| 2008/0052273 A1 | 2/2008 | Pickens | |
| 2008/0059187 A1 | 3/2008 | Roitblat et al. | |
| 2008/0086433 A1 | 4/2008 | Schmidtler et al. | |
| 2008/0104060 A1 | 5/2008 | Abhyankar et al. | |
| 2008/0141117 A1 | 6/2008 | King et al. | |
| 2008/0154816 A1 | 6/2008 | Xiao | |
| 2008/0288537 A1 | 11/2008 | Golovchinsky et al. | |
| 2009/0006382 A1 | 1/2009 | Tunkelang et al. | |
| 2009/0024585 A1 | 1/2009 | Back et al. | |
| 2009/0077068 A1 | 3/2009 | Aphinyanaphongs et al. | |
| 2009/0077570 A1 | 3/2009 | Oral et al. | |
| 2009/0083200 A1 | 3/2009 | Pollara et al. | |
| 2009/0119140 A1 | 5/2009 | Kuo et al. | |
| 2009/0119343 A1 | 5/2009 | Jiao et al. | |
| 2009/0157585 A1 | 6/2009 | Fu et al. | |
| 2009/0164416 A1 | 6/2009 | Guha | |
| 2009/0265609 A1 | 10/2009 | Rangan et al. | |
| 2010/0030763 A1 | 2/2010 | Chi | |
| 2010/0030798 A1 | 2/2010 | Kumar et al. | |
| 2010/0049708 A1 | 2/2010 | Kawai et al. | |
| 2010/0077301 A1 | 3/2010 | Bodnick et al. | |
| 2010/0082627 A1 | 4/2010 | Lai et al. | |
| 2010/0106716 A1 | 4/2010 | Matsuda | |
| 2010/0150453 A1 | 6/2010 | Ravid et al. | |
| 2010/0169244 A1 | 7/2010 | Zeljkovic et al. | |
| 2010/0198864 A1 | 8/2010 | Ravid et al. | |
| 2010/0217731 A1 | 8/2010 | Fu et al. | |
| 2010/0250474 A1 | 9/2010 | Richards et al. | |
| 2010/0253967 A1 | 10/2010 | Privault et al. | |
| 2010/0257141 A1 | 10/2010 | Monet et al. | |
| 2010/0287160 A1 | 11/2010 | Pendar | |
| 2010/0293117 A1 | 11/2010 | Xu | |
| 2010/0306206 A1 | 12/2010 | Brassil et al. | |
| 2010/0312725 A1 | 12/2010 | Privault et al. | |
| 2011/0004609 A1 * | 1/2011 | Chitiveli | G06Q 10/10 707/759 |
| 2011/0029525 A1 | 2/2011 | Knight | |
| 2011/0029526 A1 | 2/2011 | Knight et al. | |
| 2011/0029527 A1 | 2/2011 | Knight et al. | |
| 2011/0029536 A1 | 2/2011 | Knight et al. | |
| 2011/0047156 A1 | 2/2011 | Knight et al. | |
| 2011/0103682 A1 | 5/2011 | Chidlovskii et al. | |
| 2011/0119209 A1 | 5/2011 | Kirshenbaum et al. | |
| 2011/0125751 A1 | 5/2011 | Evans | |
| 2011/0251989 A1 | 10/2011 | Kraaij et al. | |
| 2011/0295856 A1 | 12/2011 | Roitblat et al. | |
| 2011/0307437 A1 | 12/2011 | Aliferis et al. | |
| 2011/0314026 A1 | 12/2011 | Pickens et al. | |
| 2011/0320453 A1 | 12/2011 | Gallivan et al. | |
| 2012/0047159 A1 | 2/2012 | Pickens et al. | |

(56) References Cited

U.S. PATENT DOCUMENTS

| | | | |
|---|---|---|---|
| 2012/0095943 | A1 | 4/2012 | Yankov et al. |
| 2012/0102049 | A1 | 4/2012 | Puzicha et al. |
| 2012/0158728 | A1 | 6/2012 | Kumar et al. |
| 2012/0191708 | A1 | 7/2012 | Barsony et al. |
| 2012/0278266 | A1 | 11/2012 | Naslund et al. |
| 2012/0278321 | A1 | 11/2012 | Traub |
| 2014/0108312 | A1 | 4/2014 | Knight et al. |
| 2014/0280173 | A1* | 9/2014 | Scholtes ............... G06N 7/005 707/740 |
| 2015/0012448 | A1 | 1/2015 | Bleiweiss et al. |
| 2015/0310068 | A1 | 10/2015 | Pickens et al. |
| 2015/0324451 | A1 | 11/2015 | Cormack et al. |
| 2016/0019282 | A1* | 1/2016 | Lewis .................... G06F 16/35 707/740 |
| 2016/0371260 | A1 | 12/2016 | Cormack et al. |
| 2016/0371261 | A1 | 12/2016 | Cormack et al. |
| 2016/0371364 | A1 | 12/2016 | Cormack et al. |
| 2016/0371369 | A1 | 12/2016 | Cormack et al. |

OTHER PUBLICATIONS

Yang, et al. "Inflection points and singularities on C-curves," Computer Aided Geometric Design 21 (2004) pp. 207-213.

Almquist, "Mining for Evidence in Enterprise Corpora", Doctoral Dissertation, University of Iowa, 2011, http://ir.uiowa.edu/etd/917.

Analytics News Jul. 11, 2013, Topiary Discovery LLC blog, Critical Thought in Analytics and eDiscovery [online], [retrieved on Jul. 15, 2013]. Retrieved from the Internet: URL<postmodern-ediscovery.blogspot.com>.

Bagdouri et al. "Towards Minimizing the Annotation Cost of Certified Text Classification," CIKM '13, Oct. 27-Nov. 1, 2013.

Ball, "Train, Don't Cull, Using Keywords", [online] Aug. 5, 2012, [retrieved on Aug. 30, 2013]. Retrieved from the Internet: URL<ballinyourcout.wordpress.com/2012/08/05/train-don't-cull-using-keywords/.

Büttcher et al., "Information Retrieval Implementing and Evaluating Search Engines", The MIT Press, Cambridge, MA/London, England, Apr. 1, 2010.

Cormack et al., "Efficient and Effective Spam Filtering and Re-ranking for Large Web Datasets", Apr. 29, 2010.

Cormack et al., "Machine Learning for Information Retrieval: TREC 2009 Web, Relevance Feedback and Legal Tracks", Cheriton School of Computer Science, University of Waterloo.

Cormack et al., "Power and Bias of Subset Pooling Strategies", Published Jul. 23-27, 2007, SIGIR 2007 Proceedings, pp. 837-838.

Cormack et al., "Reciprocal Rank Fusion outperforms Condorcet and Individual Rank Learning Methods", SIGIR 2009 Proceedings, pp. 758-759.

Cormack et al., "Autonomy and Reliability of Continuous Active Learning for Technology-Assisted Review," Apr. 26, 2015.

Cormack et al., "Evaluation of Machine-Learning Protocols for Technology-Assisted Review in Electronic Discovery," Jan. 27, 2014.

Cormack et al., "Evaluation of Machine-Learning Protocols for Technology-Assisted Review in Electronic Discovery," SIGIR 14, Jul. 6-11, 2014.

Cormack et al., "Multi-Faceted Recall of Continuous Active Learning for Technology-Assisted Review," Sep. 13, 2015.

Cormack et al., "Scalability of Continuous Active Learning for Reliable High-Recall Text Classification," Feb. 12, 2016.

Cormack et al., "Engineering Quality and Reliability in Technology-Assisted Review," Jan. 21, 2016.

Cormack et al., "Waterloo (Cormack) Participation in the TREC 2015 Total Recall Track," Jan. 24, 2016.

Godbole et al., "Document classification through interactive supervision of document and term labels", PKDD 2004, pp. 12.

Grossman et al., "Technology-Assisted Review in E-Discovery Can Be More Effective and More Efficient Than Exhaustive Manual Review", XVII Rich. J.L. & Tech. 11 (2011), http://jolt.richmond.edu/v17i3/article11.pdf.

Lad et al., "Learning to Rank Relevant & Novel Documents Through User Feedback", CIMM 2010, pp. 10.

Lu et al., "Exploiting Multiple Classifier Types with Active Learning", GECCO, 2009, pp. 1905-1908.

Pace et al., "Where the Money Goes: Understanding Litigant Expenditures for Producing Electronic Discovery", RAND Institute for Civil Justice, 2012.

Pickens, "Predictive Ranking: Technology Assisted Review Designed for the Real World", Catalyst Repository Systems, Feb. 1, 2013.

Safedi et al., "active learning with multiple classifiers for multimedia indexing", Multimed. Tools Appl., 2012, 60, pp. 403-417.

Shafiei et al., "Document Representation and Dimension Reduction for Text Clustering", Data Engineering Workshop, 2007, pp. 10.

Seggebruch, "Electronic Discovery Utilizing Predictive Coding", Recommind, Inc. [online], [retrieved on Jun. 30, 2013]. Retrieved from the Internet: URL<http://www.toxictortlitigationblog.com/Disco.pdf>.

Wallace et al., "Active Learning for Biomedical Citation Screening," KDD' 10 , Jul. 28-Aug. 1, 2010.

Webber et al., "Sequential Testing in Classifier Evaluation Yields Biased Estimates of Effectiveness," SIGIR '13, Jul. 28-Aug. 1, 2013.

* cited by examiner

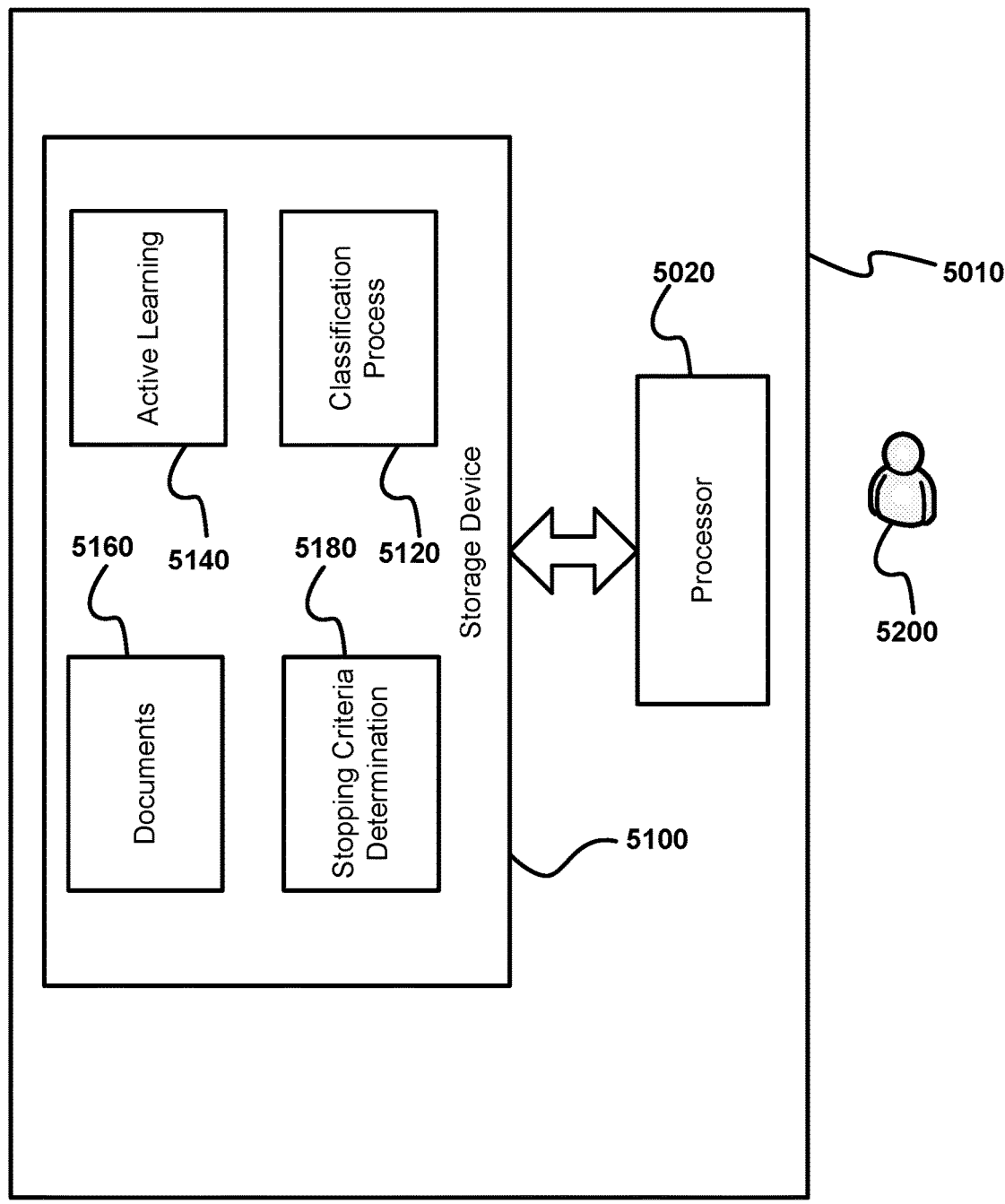

SYSTEMS AND METHODS FOR A SCALABLE CONTINUOUS ACTIVE LEARNING APPROACH TO INFORMATION CLASSIFICATION

CROSS-REFERENCE TO RELATED APPLICATIONS

The present application claims the benefit of U.S. Provisional Application No. 62/182,028, filed on Jun. 19, 2015, entitled "Systems and Methods for Conducting and Terminating a Technology-Assisted Review, and U.S. Provisional Application 62/182,072, filed on Jun. 19, 2015, entitled "Systems and Methods for Conducting a Highly Autonomous Technology-Assisted Review."

The present application is also related to concurrently filed U.S. patent application Ser. No. 15/186,360 (published as U.S. Patent Publication No. 2016/0371364, and which issued as U.S. Pat. No. 10,445,374) entitled "Systems and Methods for Conducting and Terminating a Technology-Assisted Review" by Cormack and Grossman (herein after "Cormack I").

The present application is also related to concurrently filed U.S. patent application Ser. No. 15/186,366 (published as U.S. Patent Publication No. 2016/0371260, and which issued as U.S. Pat. No. 10,353,961) entitled "Systems and Methods for Conducting and Terminating a Technology-Assisted Review" by Cormack and Grossman (herein after "Cormack II").

The present application is also related to concurrently filed U.S. patent application Ser. No. 15/186,377 (published as U.S. Patent Publication No. 2016/0371369, and which issued as U.S. Pat. No. 10,242,001) entitled "Systems and Methods for Conducting and Terminating a Technology-Assisted Review" by Cormack and Grossman (herein after "Cormack III").

The present application is also related to concurrently filed U.S. patent application Ser. No. 15/186,382 (published as U.S. Patent Publication No. 2016/0371261, and which issued as U.S. Pat. No. 10,229,117) entitled "Systems and Methods for Conducting a Highly Autonomous Technology-Assisted Review Classification" by Cormack and Grossman (herein after "Cormack IV").

The present application is also related to U.S. application Ser. No. 13/840,029 (now, U.S. Pat. No. 8,620,842), filed on Mar. 15, 2013 entitled "Systems and methods for classifying electronic information using advanced active learning techniques" by Cormack and Grossman and published as U.S. Patent Publication No. 2014/0279716 (herein after "Cormack VI").

The contents of all of the above-identified applications and patent publications are hereby incorporated by reference in their entireties.

FIELD OF THE INVENTION

The present invention relates generally to information processing and classification. More particularly, the present invention relates to systems, methods and computer readable media for classifying information in a technology-assisted review ("TAR") process using a scalable continuous active learning ("S-CAL") approach. This S-CAL approach may be used to efficiently classify and rank each one of a plurality of documents in a collection of electronically stored information.

BACKGROUND

Technology-assisted review ("TAR") involves the iterative retrieval and review of documents from a collection until a substantial majority (or "all") of the relevant documents have been reviewed or at least identified. At its most general, TAR separates the documents in a collection into two classes or categories: relevant and non-relevant. Other (sub) classes and (sub) categories may be used depending on the particular application.

Presently, TAR lies at the forefront of information retrieval ("IR") and machine learning for text categorization. Much like with ad-hoc retrieval (e.g., a Google search), TAR's objective is to find documents to satisfy an information need, given a query. However, the information need in TAR is typically met only when substantially all of the relevant documents have been retrieved. Accordingly, TAR relies on active transductive learning for classification over a finite population, using an initially unlabeled training set consisting of the entire document population. While TAR methods typically construct a sequence of classifiers, their ultimate objective is to produce a finite list containing substantially all relevant documents, not to induce a general classifier. In other words, classifiers generated by the TAR process are a means to the desired end (i.e., an accurately classified document collection).

Some applications of TAR include electronic discovery ("eDiscovery") in legal matters, systematic review in evidence-based medicine, and the creation of test collections for IR evaluation. See G. V. Cormack and M. R. Grossman, Evaluation of machine-learning protocols for technology-assisted review in electronic discovery (*Proceedings of the 37th International ACM SIGIR Conference on Research and Development in Information Retrieval*, pages 153-162, 2014); C. Lefebvre, E. Manheimer, and J. Glanville, Searching for studies (*Cochrane handbook for systematic reviews of interventions*. New York: Wiley, pages 95-150, 2008); M. Sanderson and H. Joho, Forming test collections with no system pooling (*Proceedings of the 27th Annual International ACM SIGIR Conference on Research and Development in Information Retrieval*, pages 33-40, 2004). As introduced above, in contrast to ad-hoc search, the information need in TAR is typically satisfied only when virtually all of the relevant documents have been discovered. As a consequence, a substantial number of documents are typically examined for each classification task. The reviewer is typically an expert in the subject matter, not in IR or data mining. In certain circumstances, it may be undesirable to entrust the completeness of the review to the skill of the user, whether expert or not. For example, in eDiscovery, the review is typically conducted in an adversarial context, which may offer the reviewer limited incentive to conduct the best possible search.

TAR systems and methods including unsupervised learning, supervised learning, and active learning are discussed in Cormack VI. Generally, the property that distinguishes active learning from supervised learning is that with active learning, the learning algorithm is able to choose the documents from which it learns, as opposed to relying on user- or random selection of training documents. In pool-based settings, the learning algorithm has access to a large pool of unlabeled examples, and requests labels for some of them. The size of the pool is limited by the computational effort necessary to process it, while the number of documents for which labels are requested is limited by the human effort required to label them.

Lewis and Gale in "A sequential algorithm for training text classifiers" (*Proceedings of the 17th Annual International ACM SIGIR Conference on Research and Development in Information Retrieval*, pages 3-12, 1994) compared three strategies for requesting labels: random sampling, relevance sampling, and uncertainty sampling, concluding that, for a fixed labeling budget, uncertainty sampling generally yields a superior classifier. At the same time, however, uncertainty sampling offers no guarantee of effectiveness, and may converge to a sub-optimal classifier. Subsequent research in pool-based active learning has largely focused on methods inspired by uncertainty sampling, which seek to minimize classification error by requesting labels for the most informative examples. Over and above the problem of determining the most informative examples, the computational cost of selecting examples and re-training the classifier is of concern, motivating research into more efficient algorithms and batch learning methods.

For example, a baseline model implementation ("BMI") employing Continuous Active Learning ("CAL") and relevance feedback consistently achieved over 90% recall across the collections of the TREC 2015 Total Recall Track. Recall and other measures associated with information classification are discussed in Cormack VI. This BMI used a labeling and review budget for each topic equal to 2R+1000, where R is the number of documents in the collection relevant to the topic. R can also be expressed according to the following equation: $R=\rho \cdot D$, where D is the number of documents in the collection and p is the prevalence of relevant documents in the collection.

The challenge of reliably and efficiently achieving high recall for large datasets is of critical importance, but has not been well addressed in the prior art. Within the context of electronic discovery ("eDiscovery") in legal matters, this need has been particularly acute, as voiced by parties and their counsel, technology providers, and the courts. Yet a solution has remained elusive. In the absence of a solution, parties have agreed to—or been required to undertake burdensome protocols that offer little assurance of success.

Accordingly, there is a need for a solution to the TAR problem that further minimizes human review effort, such that the review effort is no longer simply proportional to the number of relevant documents. Furthermore, there is a need for a TAR solution to provide calibrated estimates of recall, precision, and/or prevalence in order to further provide a classification that meets one or more target criteria.

SUMMARY OF PARTICULAR EMBODIMENTS OF THE INVENTION

The invention provides novel systems and methods for classifying information such that classifiers generated during iterations of the classification process will be able to accurately classify information for an information need to which they are applied (e.g., accurately classify documents in a collection as relevant or non-relevant) and thus, achieve high quality (e.g., high recall). In addition, these novel systems and methods reduce human review effort, allow for the classification of larger document collections and are able to provide calibrated estimates of recall, precision, and/or prevalence in order to further provide a classification that meets one or more target criteria.

Systems and computerized methods for classifying information are provided. The systems and methods receive an identification of a relevant document, which is used as part of a training set. The systems and methods also select a set of documents U from a document collection. The document collection is stored on a non-transitory storage medium. The systems and methods assign a default classification to one or more documents in U, which is to be used as part of a training set. The systems and methods train a classifier using the training set and score the documents in U using the classifier. The systems and methods also remove documents from the training set. The systems and methods select a first batch size documents from U to form a set V and select a first sub-sample of documents from V to form a set W. The systems and methods further present documents in W to a reviewer and receive from the reviewer user coding decisions associated with the presented documents. The systems and methods add one documents presented to the reviewer to the training set and remove those documents from U. The systems and methods also estimate a number of relevant documents in V using the number of relevant documents identified in the user coding decisions received from the reviewer. The systems and methods further update the classifier using documents in the training set and estimate a prevalence of relevant documents in the document collection. Upon determining that a stopping criteria has been reached, the systems and methods calculate a threshold for the classifier using the estimated prevalence, and classify the documents in the document collection using the classifier and the calculated threshold.

In certain embodiments, upon determining that a stopping criteria has not been reached, the systems and methods further score the documents in U using an updated classifier, select a second batch size of documents from U to form a set V, and select a second sub-sample size of documents from V to form a set W, and repeat the steps of presenting documents to a reviewer, receiving user coding decisions, adding reviewed documents to the training set and removing said documents from U, estimating the number of relevant documents in V; updating the classifier, estimating the prevalence of relevant documents, and determining whether a stopping criteria has been reached.

In certain embodiments, the second batch size is calculated based on the first batch size. In certain embodiments, the size of the second sub-sample is varied between iterations. In certain embodiments, the number of relevant documents in V is estimated based on the estimate from a prior iteration, the number of relevant documents identified by the reviewer, and the number of documents in W presented to a reviewer. In certain embodiments, the number of documents presented to the reviewer is computed based on the second batch size, an estimate of the number of relevant documents, and the second sub sample size.

In certain embodiments, the prevalence of relevant documents is estimated using intermediate results of a plurality of iterations of a TAR process. In certain embodiments, the documents in set V are selected by random sampling. In certain embodiments, the documents in set W are the highest scoring documents from V. In certain embodiments, the stopping criteria is the exhaustion of the set U. In certain embodiments, the threshold is calculated using a targeted level of recall. In certain embodiments, the threshold is calculated by maximizing $F_1$.

BRIEF DESCRIPTION OF THE DRAWINGS

The inventive principles are illustrated in the figures of the accompanying drawings which are meant to be exemplary and not limiting, and in which:

FIG. 5 is a block diagram illustrating components of a system suitable for use in an information classification platform according to certain embodiments.

DETAILED DESCRIPTION OF EMBODIMENTS OF THE INVENTION

Figure 1:
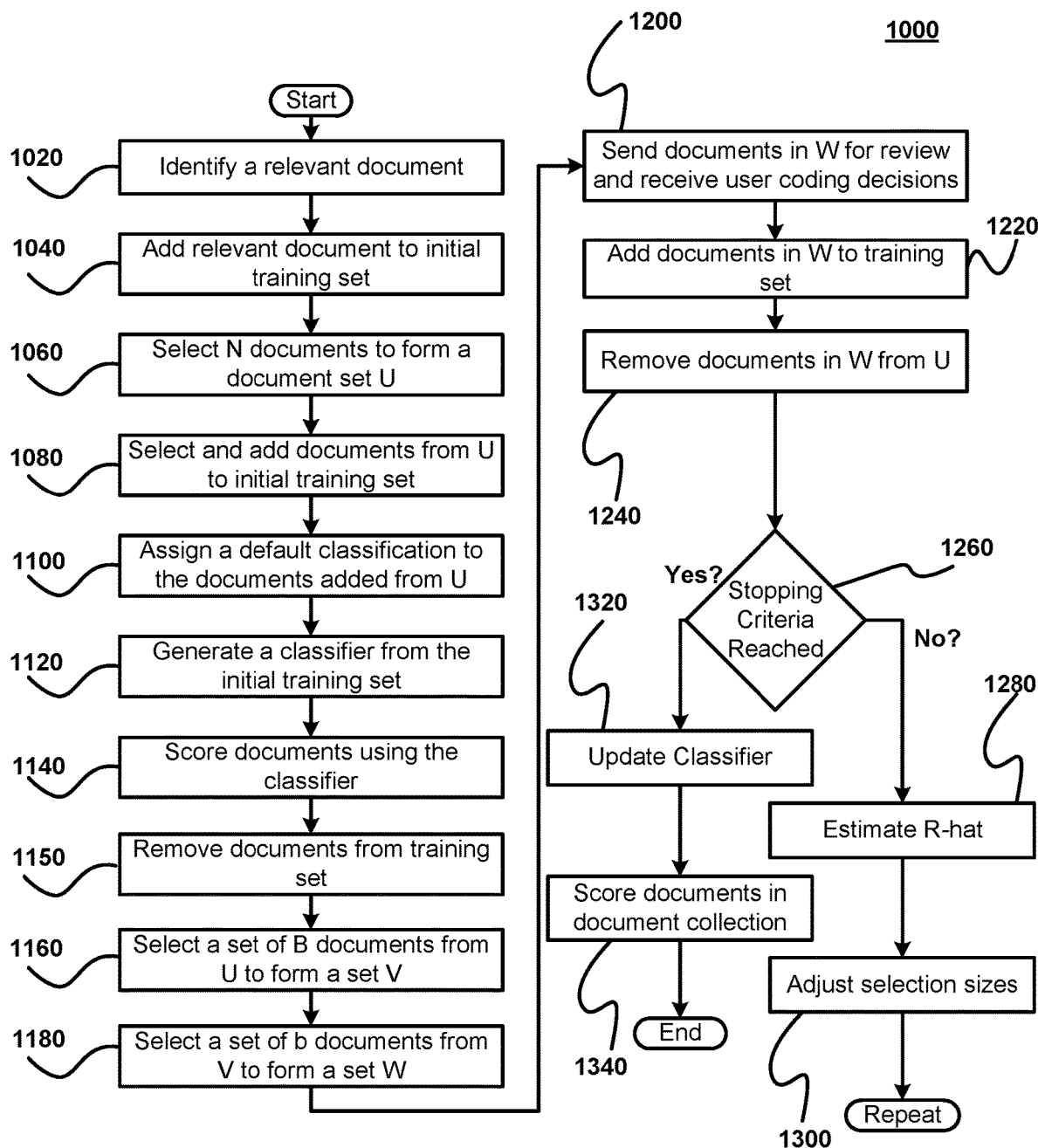
FIG. 1 is a flow diagram illustrating a TAR process for classifying information using an S-CAL approach in accordance with some embodiments of the present invention.

Generally, S-CAL develops a classifier, which is used as part of a scoring function S, from a sample of N documents using a sub-sample size n of reviewed documents. This process incurs a labeling effort of I documents. In turn, the classifier (and scoring function) is used to classify a larger collection of documents.

More specifically, S-CAL uses an initially unlabeled training set, which may be drawn at random from a potentially infinite collection, and one or more relevant documents. The relevant documents may be located in the document collection to be classified using an ad-hoc search or be a synthetic document constructed for the purpose of approximating an actual relevant document in the document collection. Synthetic documents are discussed in Cormack VI. See e.g., Cormack VI, ¶¶ 184-186. Batches of documents of increasing (e.g., exponentially increasing) size are selected (e.g., using relevance feedback), and labels are requested for a sub-sample of each batch. Use of relevance feedback to select documents is also discussed in Cormack VI. See e.g., Cormack VI, ¶¶ 184-192. Accordingly, the labeled examples form a stratified statistical sample of the entire collection, which is used for training and statistical estimation.

In the following sections, S-CAL methods will be described. In addition, in certain embodiments, it will be demonstrated that the running time for such S-CAL methods is O(N log N), where N is the size of the unlabeled training set. Similarly, in certain embodiments, the labeling cost of S-CAL will be demonstrated to be O(log N). These associated running/labeling costs are an improvement over standard CAL techniques, which has a running time that is proportional to the size of the document collection (and may be unbounded), and a labeling cost of O(R), respectively. Furthermore, the effectiveness of the classifier and the accuracy of the estimates produced by S-CAL, comparable favorably to the best available TAR baselines.

The systems and methods described and claimed herein are particularly useful for transforming an unclassified collection of information into a collection of classified information by generating and applying one or more classifiers to the unclassified information (e.g., documents). Beyond effecting this particular transformation, the systems and methods described and claimed herein are more efficient than other systems and methods for classifying information, while still maintaining overall classification accuracy. The systems and methods described herein reduce classification running times for similar sized data sets when compared to other systems and methods. For example, the systems and methods described herein reduce the proportionality of the human review effort, which allows the size of the document collection to increase indefinitely and also allows for review of document collections with a much lower prevalence p while still producing accurate results. Thus, the efficiencies of the systems and methods described and claimed herein are not merely based on the use of computer technology to improve classification speed. Instead, these systems and methods represent a fundamental improvement in at least the field of information classification by virtue of their overall configuration.

FIG. 1 is a process flow diagram that illustrates a method 1000 for an iterative TAR process employing an S-CAL approach to generate one or more classifiers, which are in turn used to classify information (e.g., documents in a collection). Intermediate and/or final results for each iteration of the described method may be recorded (e.g., stored in a memory) for later use. In step 1020, one or more relevant documents is identified and an indication of the relevant document may be received. In certain embodiments, a relevant document may be identified using an ad-hoc search to locate such a document in the document collection. Use of ad-hoc searches to identify documents is discussed in Cormack VI. See e.g., Cormack VI, ¶¶ 65-70, 184-186. In certain embodiments, a relevant document may be identified by constructing a synthetic relevant document. For example, a synthetic document may be created using a description or approximation of a relevant document. More specifically, if relevant documents were directed to an action involving a breach of contract, a synthetic document could be created to approximate a contract between the parties.

In step 1040, one or more relevant documents are added to an initial training set. For example, the relevant documents identified in step 1020 may form an initial training set. In step 1060, a number of documents (N) are selected from the document collection to form a set U. In certain embodiments, the documents may be selected using a uniform random sample of the document collection. The documents, however, may be selected in any known manner (e.g., ad-hoc search, relevance feedback, uncertainty sampling). Techniques for selecting documents are discussed in Cormack VI. See e.g., Cormack VI, ¶¶ 65-70, 184-190. These selection techniques may be applied for each step calling for document selection.

In step 1080, one or more documents from U are selected and added to the initial training set. These documents may be selected in any known manner. In certain embodiments, one hundred random documents are selected and added to the initial training set. In step 1100, the one or more documents selected in step 1080 are given a default classification. In certain embodiments, the default classification is "non-relevant." In certain embodiments, the documents are assigned a default classification of "relevant." In certain embodiments, the documents are assigned a mixture of default classifications (e.g., "relevant" and "non-relevant"). When assigning a mixture of default classifications, the assignments may be made in any suitable proportion.

In step 1120, one or more classifiers are generated using the initial training set and any assigned labels/classifications (e.g., relevant, non-relevant). The classifiers may be generated in any known manner. For example, Cormack VI describes systems and methods for generating a classifier using document information profiles (e.g., n-grams) and user coding decisions (e.g., relevant, non-relevant). See e.g., Cormack VI, ¶¶ 90-119. In certain embodiments, such a classifier may be generated using Sofia ML and/or SVM$^{light}$.

In step 1140, the classifiers are applied to the documents in the document collection to generate document scores. The document score may be generated in any known manner. For example, Cormack VI describes systems and methods for generating a document score using a classifier and a document information profile. See e.g., Cormack VI, ¶¶ 90-123. In certain embodiments, document scores are generated only for the documents in U.

In step 1150, one or more documents in the training set are removed from the training set. In certain embodiments, the documents added in step 1080 are removed from the training set. In certain preferred embodiments, all of the documents receiving default classifications are removed from the training set. In step 1160, a number of documents of a batch size B are selected from U to form a set V. In certain embodiments, B is initially 1. The B documents may be selected in any known manner. In certain embodiments, the documents are the B documents with the highest document scores computed in step 1140. In certain embodiments, the documents are selected by uncertainty sampling.

In step 1180, one or more documents are selected from the document set V to form a sub-sample set W. The documents may be selected in any known manner. In certain embodiments, the documents are selected by randomly sampling V. In certain embodiments, the number of documents selected is equal to b. In certain embodiments, b=B if R<=1 or B≤n, otherwise b=n, where n is a desired sub-sample size. In certain embodiments, the limit n on b need not be a constant. For example, when $\hat{R}=0$ b may be allowed to grow beyond n to handle cases where the classifier has not yet located any relevant documents. In certain embodiments, the value of b is a complex function of $\hat{R}$. In certain embodiments, the sub-sample size b (or n) is varied between iterations. In certain embodiments, b (or n) and/or N may be selected to balance computational efficiency, labeling efficiency, classifier effectiveness, and reliability. Generally, any growth rate for b (or n) will be efficient, so long as it is smaller than the growth rate of B (discussed below). If the growth rate of b is less than B, the review effort is O(log N).

In step 1200, the documents in W are assigned user coding decisions (e.g., relevant, non-relevant). In step, 1220, any documents in W that were assigned user coding decisions may be added to the training set. In step 1240, the labeled documents in W may be removed from U.

In step 1260, a determination is made as to whether a stopping criteria is reached. For example, any of the stopping criteria for TAR processes discussed in Cormack I-III and VI may be used. In certain embodiments, a stopping criteria is reached when there are no more documents left in U (see, e.g., step 1240) or the entire document collection itself is assigned user coding decisions. In certain embodiments, if a stopping criteria is not reached, certain steps (e.g., steps 1060-1320 of the method 1000) are repeated until a stopping criteria is reached.

In step 1280, the number of relevant documents among those retrieved ($\hat{R}$) is estimated. In certain embodiments, R is computed according to the following equation:

$$\hat{R} = \hat{R}_{prev} + \frac{r \cdot B}{b},$$

where $\hat{R}_{prev}$ is the value of $\hat{R}$ from the previous iteration, r is the number of relevant documents in W, and b is the size of sub-sample set W (i.e., the number of documents selected from the batch V for review). In certain embodiments, $\hat{R}_{prev}$ is initially 0 (e.g., in the first iteration).

In step 1300, selection sizes may be updated. For example, a new batch size B may be selected. In certain embodiments, B is increased by ⌈B·growth_rate⌉. In certain embodiments, growth_rate is set to 1/10. In other embodiments, the growth_rate is varied (e.g., between iterations of method 1000). In certain embodiments, growth_rate remains constant between successive iterations of method 1000. In certain embodiments, growth_rate=0. Similarly, selections sizes for N, b, and/or n may also be updated as discussed with respect to steps 1060 and 1180. For example, like B-N, b, and/or n may be increased according to an associated growth rate. For certain data sets, it may be preferable to make N as large as possible and to select n to balance classifier effectiveness with labeling effort. Generally, as n increases so does labeling effort.

If a stopping criteria has been reached, in step 1320, the one or more classifiers are finally updated using the user coding decisions assigned to the documents. In step 1340, the documents in the collection are scored using the computed classifier.

Figure 2:
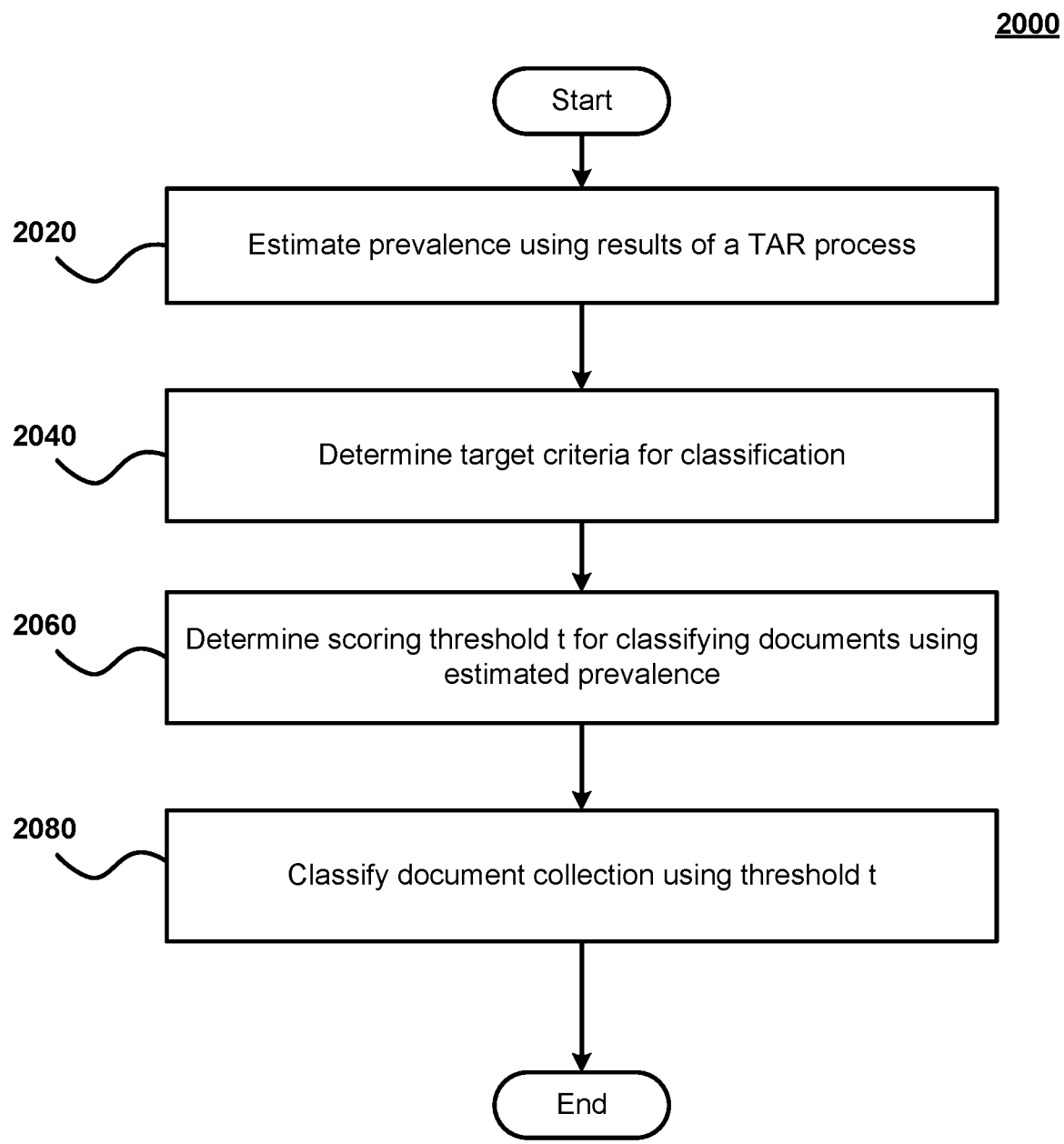
FIG. 2 is a flow diagram illustrating a process for classifying information using statistical measures derived from the final output and/or the intermediate results of a TAR review in accordance with some embodiments of the present invention.

FIG. 2 is a process flow diagram that illustrates a method 2000 for classifying information using statistical measures developed from the output of a TAR review. In certain embodiments, the TAR review is conducted according to an S-CAL approach, such as the methods discussed with respect to FIG. 1 and its corresponding description. In step 2020, an estimate of prevalence $\hat{\rho}$ is computed. In certain embodiments, prevalence $\hat{\rho}$ may be computed as a ratio of the number of documents labeled as relevant (e.g., through a user a coding decision) to the number of documents in a larger collection (e.g., the number of documents that could have potentially been reviewed). In certain embodiments, $\hat{\rho}$ is computed according to the equation:

$$\hat{\rho} = \frac{\text{scale} \cdot \hat{R}}{N},$$

where scale is a scaling factor designed to adjust for an over/underestimation of prevalence inherent in the selected TAR process. In certain embodiments, scale equals 1.05. Scale, however, can be estimated over time (e.g., over multiple classification efforts) by assigning labels (e.g., receiving user coding decisions) to additional un-reviewed documents (e.g., those N documents in set U) to get a better sense of whether the TAR process itself generally results in over/underestimation of prevalence.

In step 2040, a target criterion is selected. For example, a selected target criterion may be used to minimize or maximize a particular measure (e.g., a minimum level of recall or a maximization of $F_1$). Other possibilities for target criteria include other F measures (e.g., $F_2$) or any of the measures of quality or effort discussed in Cormack I, II, and/or III.

In step 2060, depending on the target criteria a threshold t may be computed. Generally, the threshold t is selected or computed such that when t is employed to discriminate relevant from non-relevant documents (e.g., by labeling them), the target criteria is satisfied. For example, t may be used to discriminate or label the documents according to the following relationship:

$$\begin{Bmatrix} \text{relevant}, & [S_{k+1}(d) \geq t] \\ \text{non-relevant}, & [S_{k+1}(d) < t] \end{Bmatrix},$$

where $S_k$ is the document scoring function for a classifier generated by an iteration k of a TAR process. In step 2080, the document collection may be classified using the scoring function $S_k$ and the threshold t. For example, a document scoring function may be realized by applying the classifier to the document's information profile as discussed in Cormack VI. See e.g., Cormack VI, ¶¶ 120-123, 104.

Figure 3:
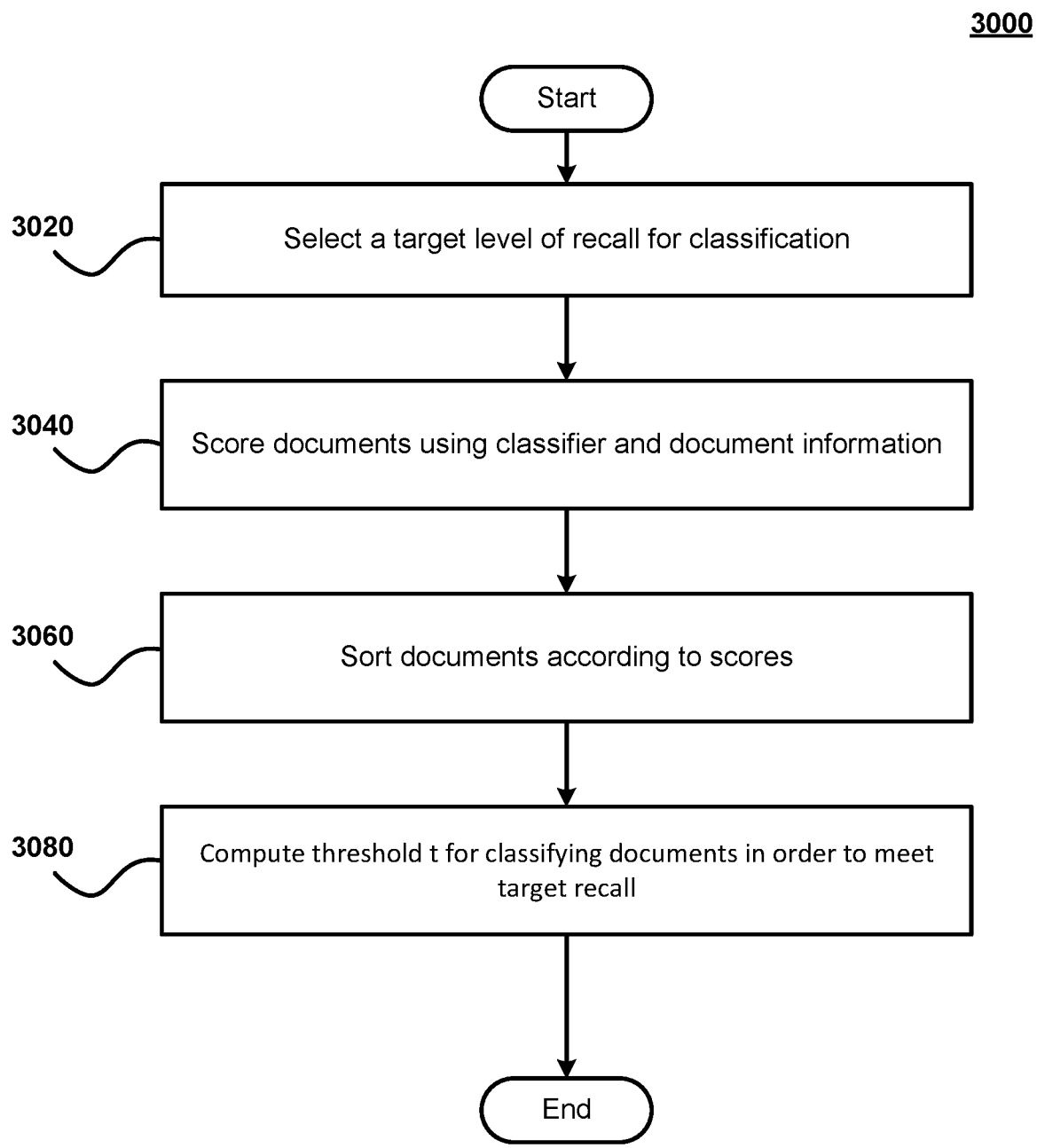
FIG. 3 is a flow diagram illustrating a process for computing a threshold used to classify information, such that the classification meets a specified target criteria in accordance with some embodiments of the present invention.

FIG. 3 is a process flow diagram that illustrates a method 3000 for selecting a threshold t to achieve a minimum level of recall. In step 3020, a target level of recall TR is selected. Generally, to achieve the target level of recall, it is necessary to label/retrieve TR·ρD documents as relevant, where D is the number of documents in the collection. In step 3040, the documents are scored by applying a classifier (e.g., the final classifier) to the documents. In certain embodiments, only the documents in the set U are scored. In step 3060, the documents are sorted according to score. In step 3080, a scoring threshold t is determined. In certain embodiments, the threshold t can be determined by finding a threshold t such that m of the scored documents are deemed relevant by the classifier (e.g., achieve a score of t or higher as discussed above with respect to step 2040 of FIG. 2), where the m documents include approximately TR·$\hat{\rho}$Q documents that are actually relevant, and Q is the number of documents that were potentially subject to review during the TAR process. In certain embodiments, Q is the size of a uniform random sample of documents U from the document collection.

To set a threshold t for maximizing $F_1$ instead of targeting a minimal level of recall, m can instead be calculated at the recall-precision break-even point, which has been observed to represent the approximate maximum of $F_1$. In this case, m can be computed as m=$\hat{\rho}$N.

Figure 4:
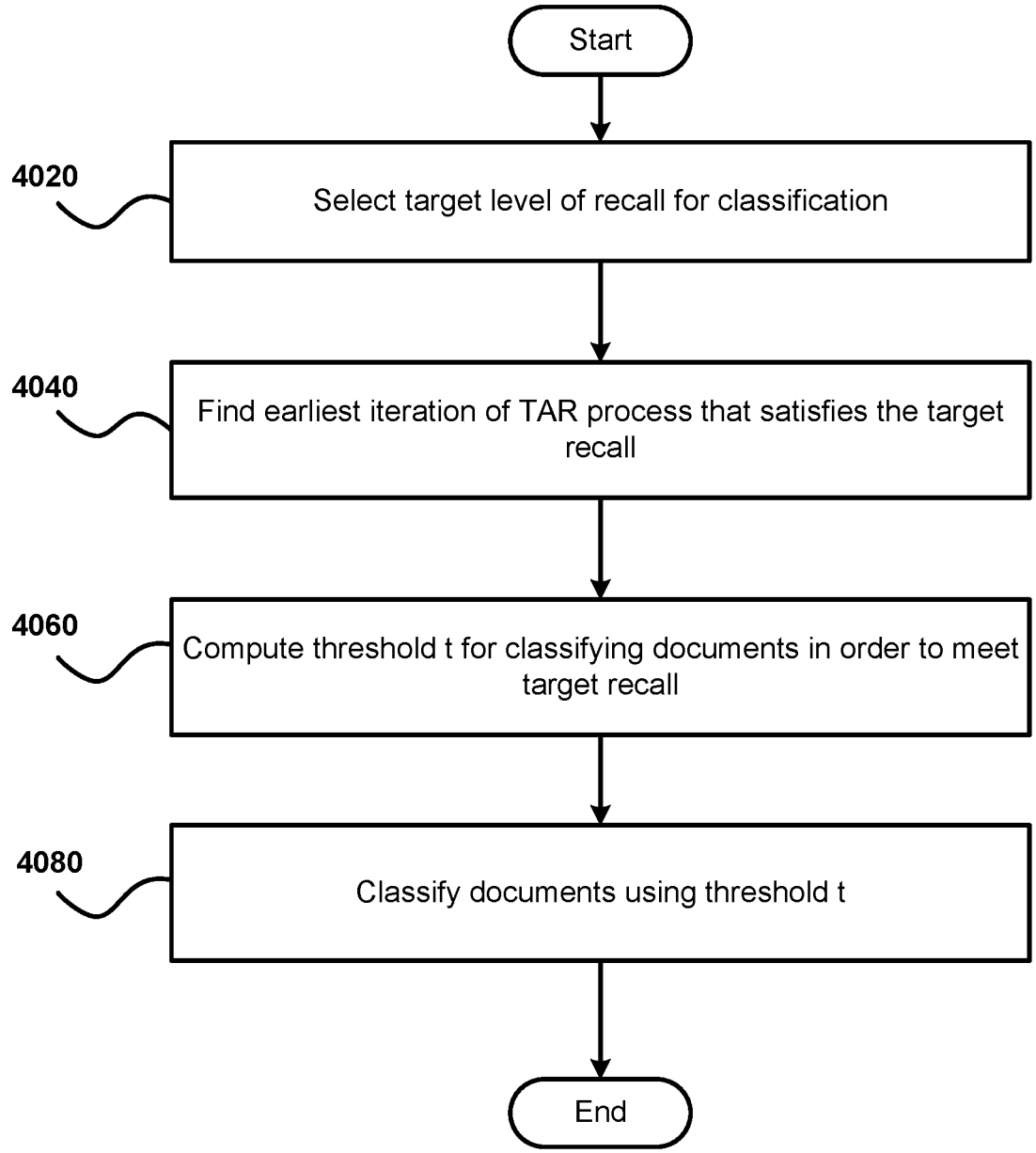
FIG. 4 is a flow diagram illustrating a process for computing a threshold used to classify information, such that the classification meets a specified target criteria in accordance with some embodiments of the present invention.

FIG. 4 is a process flow diagram that illustrates a method 4000 for selecting a threshold t to achieve a minimum level of recall. In this method, the intermediate results of a TAR process are used to determine a threshold t. For example, the intermediate results stemming from one or more iterations of the process described with respect to FIG. 1 may be used to calculate t. Here, let $U_o, U_1 \ldots U_k$ represent the state of the document set U at each iteration j, let $\hat{R}_0, \hat{R}_1 \ldots \hat{R}_k$ represent the value of $\hat{R}$ at each iteration j, and $S_o, S_1 \ldots S_k$ represent the scoring function of the classifier computed in each iteration j. In step 4020, a target level of recall TR is selected. In step 4040, the earliest iteration j is found such that $\hat{R}_j \geq$ TR·$\hat{\rho}$N. In step 4060, t is computed such that $$t = \max_{d \in U_0 \setminus U_j} S_j(d).$$

Thus, t may be computed to be the maximum score of a document in U that was not selected in any batch. In addition to using the results calculated at the end of each TAR process iteration, it is also possible to compute t using results interpolated during an iteration. In step 4080, the documents may be classified (e.g., as relevant, non-relevant) using the computed threshold t.

In certain embodiments, to set a threshold t related to $F_1$ instead of targeting a minimal level of recall, the earliest iteration j may be found such that N−|$U_j$|≥$\hat{\rho}$·N.

FIG. 5 is an exemplary system 5000 for performing the methods discussed with respect to FIGS. 1-4 of the instant disclosure. The system 5000 may include a computing device 5010 and reviewer/user 5200. Computing device 5010 may further include a processor 5020 and storage device 5100. Storage device 5100 may be a hard disk, RAM, ROM, CD-ROM, and/or any other suitable non-transitory computer readable media. The methods discussed and described with respect to FIGS. 1-4 of the instant disclosure may be stored as instructions in one more modules (e.g., classification process 5120, active learning 5140, and stopping criteria determination 5180, or other suitable modules) and executed on a processor (e.g., processor 5020). Documents (e.g., selected documents or documents of a document collection) and/or document information profiles may also be stored in one or more storage devices (e.g., storage device 5100).

In addition, the systems and platforms described with respect to FIGS. 1-3 and 10 of Cormack VI, which is incorporated by reference herein in its entirety, may be used either independently, combined, or in conjunction with other components as part of a classification system configured to perform the methods discussed and described with respect to FIGS. 1-4 of the instant disclosure. For example, a classification system implementing the methods described with respect to FIGS. 1-4 may be implemented on a single device (e.g., a standard PC computer, tablet, laptop, smartphone, or other device). Such a device may run a standard operating system (e.g., Windows, Linux, OSX, Android, iOS) and the classification system is conventionally installed as one or more programs or libraries on the device itself. When the device is, for example, a laptop, tablet, or smartphone, the classification system is easily transportable. For example, the methods discussed and described with respect to FIGS. 1-4 of the instant disclosure may be stored in storage device 226 or 244 of Cormack VI FIGS. 3 and 10 as instructions, which may be executed on processors 224 or 242 of Cormack VI FIGS. 3 and 10. Such a device may or may not be further connected to one or more computers or other devices via a network. Alternatively, a classification system implementing the methods described with respect to FIGS. 1-4 may be distributed across a plurality of devices in communication with one another (e.g., over a network) as in FIG. 2 of Cormack VI. For example, the methods discussed and described with respect to FIGS. 1-4 of the instant disclosure may be stored in storage device 226 and/or 244 of Cormack VI FIGS. 2, 3, and 10 as instructions, which may be executed on processors 224 and/or 242 of Cormack VI FIGS. 2, 3, and 10. Alternatively, the classification system implementing the methods described with respect to FIGS. 1-4 may be contained on computer readable media (e.g., a CD, hard disk, USB drive, and/or other bootable media) which, when inserted or coupled to the device, causes the classification system to be run entirely on the device or more than one device. Such a device may or may not be further connected to one or more computers or other devices via a network.

One of ordinary skill in the art will appreciate that, aside from providing advantages in e-discovery review, the improved active learning systems, methods and media discussed throughout the disclosure herein may be applicable to a wide variety of fields that require data searching, retrieval, and screening. This is particularly true for applications which require searching for predetermined information or patterns within electronically stored information (regardless of format, language and size), especially as additional documents are added to the collection to be searched. Exemplary areas of potential applicability are law enforcement, security, and surveillance, as well as internet alert or spam filtering, regulatory reporting and fraud detection (whether within internal organizations or for regulatory agencies).

For example, in law enforcement, security, and for surveillance applications, the principles of the invention could be used to uncover new potential threats using already developed classifiers or to apply newly-classified information to discover similar patterns in prior evidence (e.g., crime or counter-terrorism prevention, and detection of suspicious activities). As another example, the principles of the invention could be used for healthcare screening using already developed classifiers or to apply newly-classified information to discover similar patterns in prior evidence (e.g., as predictors for conditions and/or outcomes).

While there have been shown and described various novel features of the invention as applied to particular embodiments thereof, it will be understood that various omissions and substitutions and changes in the form and details of the systems, methods and media described and illustrated, may be made by those skilled in the art without departing from the spirit of the invention. For example, the various method steps described herein may be reordered, combined, or omitted where applicable. Those skilled in the art will recognize, based on the above disclosure and an understanding therefrom of the teachings of the invention, that the particular hardware and devices that are part of the invention, and the general functionality provided by and incorporated therein, may vary in different embodiments of the invention. Accordingly, the particular systems, methods and results shown in the figures are for illustrative purposes to facilitate a full and complete understanding and appreciation of the various aspects and functionality of particular embodiments of the invention as realized in system and method embodiments thereof. Any of the embodiments described herein may be hardware-based, software-based and preferably comprise a mixture of both hardware and software elements. Thus, while the description herein may describe certain embodiments, features or components as being implemented in software or hardware, it should be recognized that any embodiment, feature or component that is described in the present application may be implemented in hardware and/or software. Those skilled in the art will appreciate that the invention can be practiced in other than the described embodiments, which are presented for purposes of illustration and not limitation, and the present invention is limited only by the claims which follow.

What is claimed is:

1. A system for classifying information, the system comprising:
    at least one computing device having a processor and physical memory, the physical memory storing instructions that cause the processor to:
    receive an identification of a relevant document;
    select a set of documents U from a document collection, wherein the document collection is stored on a non-transitory storage medium;
    assign a default classification to one or more documents in U to be used as a training set along with the relevant document, wherein the default classification is a presumptively assigned classification not based on a user review;
    train a classifier using the training set;
    score the documents in U using the classifier;
    remove one or more documents from the training set;
    select a first batch size documents from U to form a set V;
    select a first sub-sample of documents from V to form a set W;
    present one or more documents in W to a reviewer;
    receive from the reviewer one or more user coding decisions associated with the presented documents;
    add one or more of the documents presented to the reviewer to the training set and remove said documents from U;
    estimate a number of relevant documents in V using the number of relevant documents identified in the user coding decision received from the reviewer;
    update the classifier using one or more documents in the training set;
    estimate a prevalence of relevant documents in the document collection; and
    upon determining that a stopping criteria has been reached, calculate a threshold for the classifier using the estimated prevalence, and classify the documents in the document collection using the classifier and the calculated threshold.

2. The system of claim 1, wherein the instructions further cause the processor to:
    upon determining that a stopping criteria has not been reached,
        score the documents in U using the updated classifier;
        select a second batch size documents from U to form a set V;
        select a second sub-sample size of documents from V to form a set W; and
        repeat the steps of presenting documents to a reviewer, receiving user coding decisions, adding reviewed documents to the training set and removing said documents from U, estimating the number of relevant documents in V, updating the classifier, estimating the prevalence of relevant documents, and determining whether a stopping criteria has been reached.

3. The system of claim 2, wherein the second batch size is calculated as $$\text{first batch size} + \left\lceil \frac{\text{first\_batch\_size}}{10} \right\rceil.$$

4. The system of claim 2, wherein the size of the second sub-sample is varied between iterations.

5. The system of claim 2, wherein the number of relevant documents in V is estimated as $$\hat{R} = \hat{R}_{prev} + \frac{r \cdot B}{b},$$

where $\hat{R}_{prev}$ is the value of the estimate of $\hat{R}$ from a prior iteration, r is the number of relevant documents identified by the reviewer, B is a batch size, and b is the number of documents in W presented to a reviewer.

6. The system of claim 5, wherein b is computed as b=second batch size if $\hat{R}_{prev} \leq 1$ or the second batch size second sub sample size, otherwise b=the second sub-sample size.

7. The system of claim 2, wherein the prevalence of relevant documents is estimated using intermediate results of a plurality of iterations of a TAR process.

8. The system of claim 1, wherein the documents in set V are selected by random sampling.

9. The system of claim 1, wherein the documents in set W are the highest scoring documents from V.

10. The system of claim 1, wherein the stopping criteria is the exhaustion of the set U.

11. The system of claim 1, wherein the threshold is calculated using a targeted level of recall.

12. The system of claim 1, wherein the threshold is calculated by maximizing $F_1$.

13. The system of claim 1, wherein the documents in set W are documents randomly sampled from V.

14. A computerized method for classifying information, the method comprising:
- receiving an identification of a relevant document;
- selecting a set of documents U from a document collection, wherein the document collection is stored on a non-transitory storage medium;
- assigning a default classification to one or more documents in U to be used as a training set along with the relevant document, wherein the default classification is a presumptively assigned classification not based on a user review;
- training a classifier using the training set;
- scoring the documents in U using the classifier;
- removing one or more documents from the training set;
- selecting a first batch size documents from U to form a set V;
- selecting a first sub-sample of documents from V to form a set W;
- presenting one or more documents in W to a reviewer;
- receiving from the reviewer one or more user coding decisions associated with the presented documents;
- adding one or more of the documents presented to the reviewer to the training set and removing said documents from U;
- estimating a number of relevant documents in V using the number of relevant documents identified in the user coding decision received from the reviewer;
- updating the classifier using one or more documents in the training set;
- estimating a prevalence of relevant documents in the document collection; and
- upon determining that a stopping criteria has been reached, calculating a threshold for the classifier using the estimated prevalence, and classifying the documents in the document collection using the classifier and the calculated threshold.

15. The method of claim 14, further comprising:
- upon determining that a stopping criteria has not been reached,
  - scoring the documents in U using the updated classifier;
  - selecting a second batch size documents from U to form a set V;
  - selecting a second sub-sample size of documents from V to form a set W; and
  - repeating the steps of presenting documents to a reviewer, receiving user coding decisions, adding reviewed documents to the training set and removing said documents from U, estimating the number of relevant documents in V, updating the classifier, estimating the prevalence of relevant documents, and determining whether a stopping criteria has been reached.

16. The method of claim 15, wherein the second batch size is calculated as $$\text{first batch size} + \left\lceil \frac{\text{first\_batch\_size}}{10} \right\rceil.$$

17. The method of claim 15, wherein the size of the second sub-sample is varied between iterations.

18. The method of claim 15, wherein the number of relevant documents in V is estimated as $$\hat{R} = \hat{R}_{prev} + \frac{r \cdot B}{b},$$

where $\hat{R}_{prev}$ is the value of the estimate of $\hat{R}$ from a prior iteration, r is the number of relevant documents identified by the reviewer, B is a batch size, and b is the number of documents in W presented to a reviewer.

19. The method of claim 18, wherein b is computed as b=second batch size if $\hat{R}_{prev}<=1$ or the second batch size second sub sample size, otherwise b=the second sub-sample size.

20. The method of claim 14, wherein the prevalence of relevant documents is estimated using intermediate results of a plurality of iterations of a TAR process.

21. The method of claim 14, wherein the documents in set V are selected by random sampling.

22. The method of claim 14, wherein the documents in set W are the highest scoring documents from V.

23. The method of claim 14, wherein the stopping criteria is the exhaustion of the set U.

24. The method of claim 14, wherein the threshold is calculated using a targeted level of recall.

25. The method of claim 14, wherein the threshold is calculated by maximizing $F_1$.

26. The method of claim 14, wherein the documents in set W are documents randomly sampled from V.

* * * * *

UNITED STATES PATENT AND TRADEMARK OFFICE
CERTIFICATE OF CORRECTION

PATENT NO. : 10,671,675 B2
APPLICATION NO. : 15/186387
DATED : June 2, 2020
INVENTOR(S) : Gordon V. Cormack et al.

Page 1 of 1

It is certified that error appears in the above-identified patent and that said Letters Patent is hereby corrected as shown below:

In the Claims

In Claim 6, Column 12, Line 50, change "or the second batch size" to -- or the second batch size $\leq$ --.

In Claim 13, Column 12, Line 67, change "Ware" to -- W are --.

In Claim 19, Column 14, Line 29, change "or the second batch size" to -- or the second batch size $\leq$ --.

In Claim 26, Column 12, Line 46, change "Ware" to -- W are --.

Signed and Sealed this
Twenty-fourth Day of January, 2023

Katherine Kelly Vidal
*Director of the United States Patent and Trademark Office*